United States Patent
Alger-Meunier

Patent Number: 6,104,844
Date of Patent: Aug. 15, 2000

[54] IMAGE SENSOR HAVING A MULTIPLICITY OF PIXEL SENSOR REGIONS

[75] Inventor: Michael Alger-Meunier, München, Germany

[73] Assignee: Siemens Aktiengesellschaft, Munich, Germany

[21] Appl. No.: 09/415,729

[22] Filed: Oct. 12, 1999

Related U.S. Application Data

[63] Continuation of application No. PCT/DE98/00916, Mar. 31, 1998.

Foreign Application Priority Data

Apr. 11, 1997 [DE] Germany ............ 197 15 214

[51] Int. Cl.$^7$ ............ G06K 7/00; H04N 5/225; H01J 40/14
[52] U.S. Cl. ............ 382/312; 348/207; 250/208.1
[58] Field of Search ............ 382/165, 190, 382/276, 312, 313–315, 232; 348/207, 208, 241; 250/208.1, 332

[56] References Cited

U.S. PATENT DOCUMENTS

| | | | |
|---|---|---|---|
| 5,302,824 | 4/1994 | Prager | 250/252.1 |
| 5,644,121 | 7/1997 | Nakano et al. | 250/208.1 |
| 5,659,315 | 8/1997 | Mandl | 341/143 |
| 5,742,058 | 4/1998 | Pantigny et al. | 250/370.08 |
| 5,754,224 | 5/1998 | Kusaka | 348/207 |

FOREIGN PATENT DOCUMENTS

| | | | |
|---|---|---|---|
| 0474550A1 | 3/1992 | European Pat. Off. | H04N 3/15 |
| 4123203C1 | 10/1992 | Germany | H04N 1/28 |
| 19524577A1 | 1/1997 | Germany | H04N 3/15 |

Primary Examiner—Jose L. Couso
Assistant Examiner—Duy M. Dang
Attorney, Agent, or Firm—Herbert L. Lerner; Laurence A. Greenberg; Werner H. Stemer

[57] ABSTRACT

An image sensor has an optical configuration for imaging an image to be recorded onto sensor elements. The sensor elements have dimensions below a resolution of the optical configuration. Neighboring sensor elements are in each case combined into pixel sensor regions. During the recording of the image, the measured values X of the sensor elements of each sensor region are averaged. In this case, each average value corresponds to a pixel of the recorded image. In this manner, production-dictated tolerances of the sensor elements are compensated for by the averaging.

11 Claims, 3 Drawing Sheets

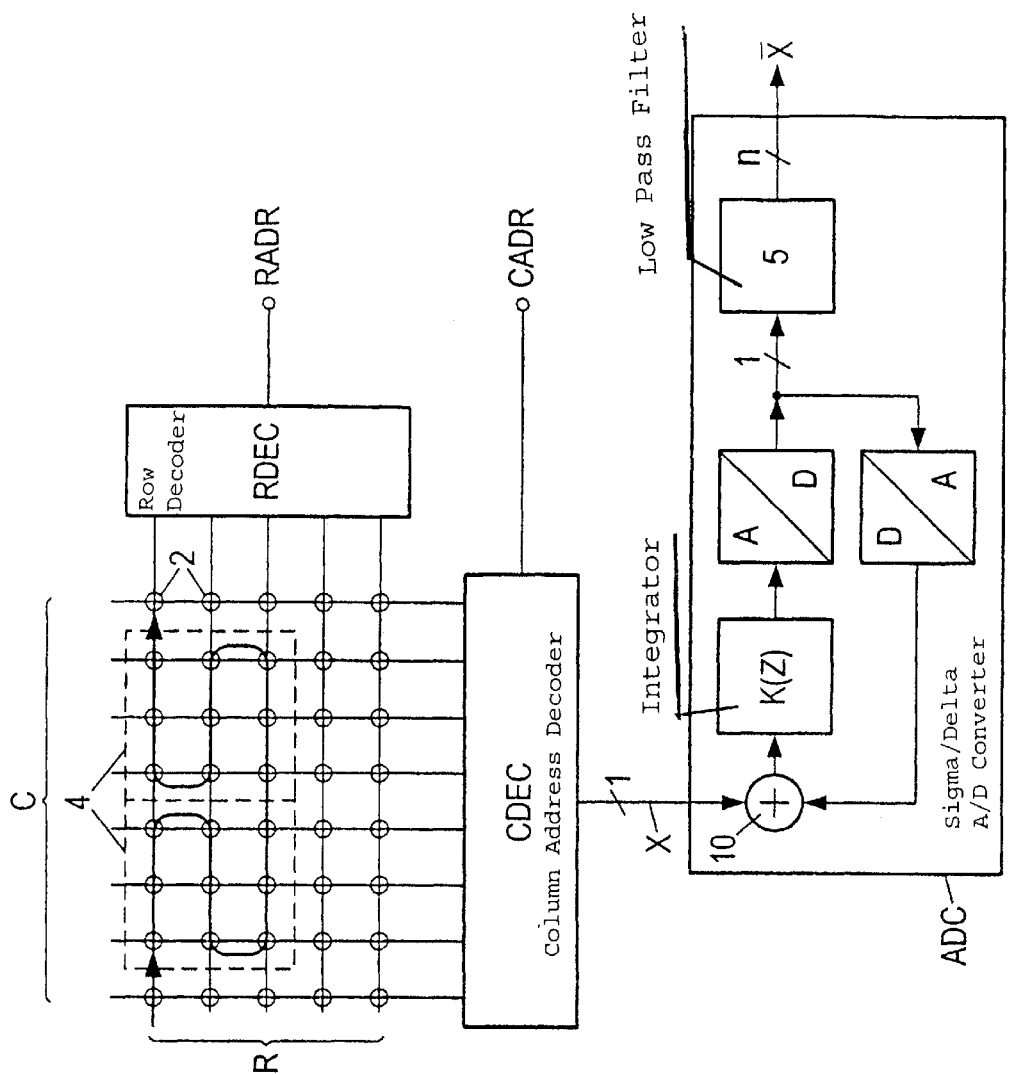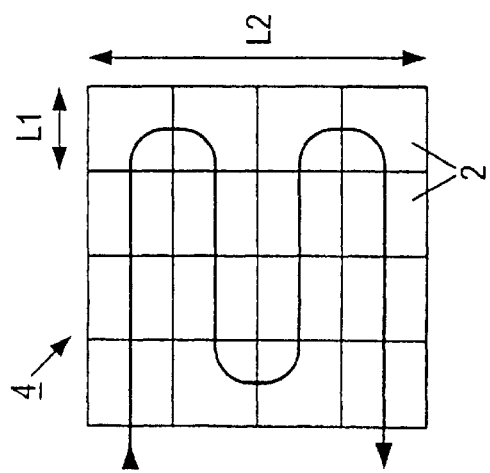

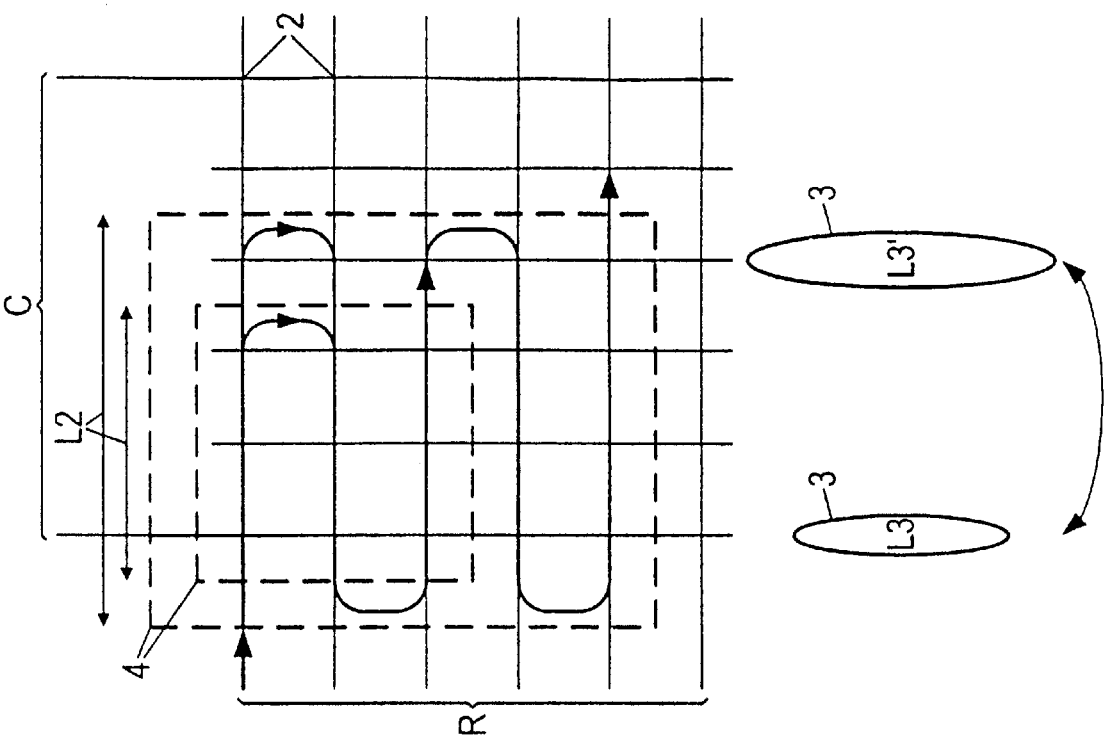
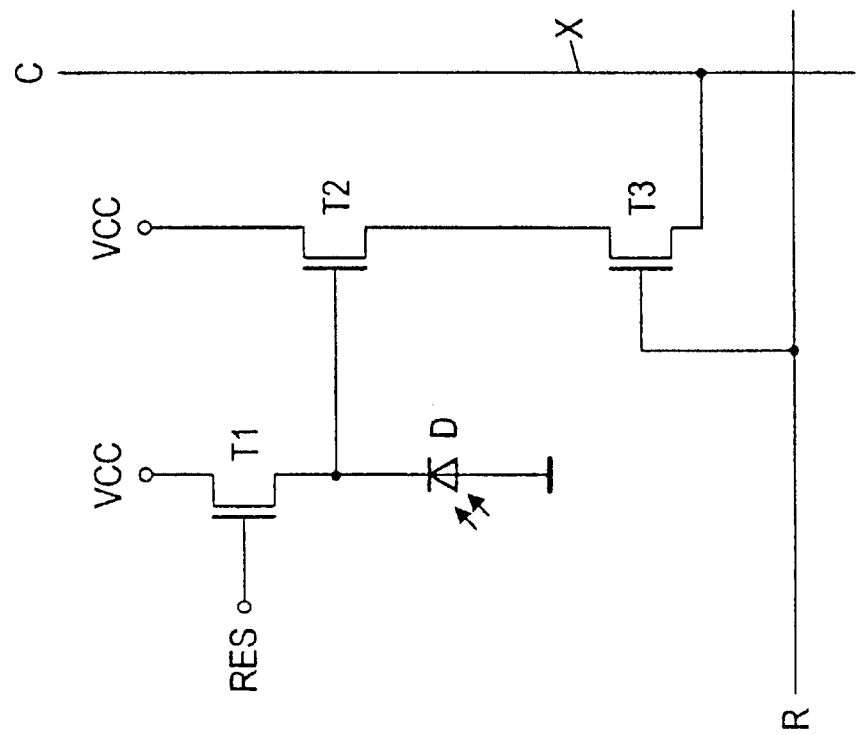

IMAGE SENSOR HAVING A MULTIPLICITY OF PIXEL SENSOR REGIONS

CROSS-REFERENCE TO RELATED APPLICATION

This application is a continuation of copending International Application PCT/DE98/00916, filed Mar. 31, 1998, which designated the United States.

BACKGROUND OF THE INVENTION

Field of the Invention

The invention relates to an image sensor having a multiplicity of pixel sensor regions and having an optical configuration, which images an image to be recorded by the image sensor onto the sensor regions.

Image sensors are known in which pixel sensor elements in the form of so-called charge coupled devices (CCDs) or CMOS sensor elements constructed using CMOS technology are used as pixel sensor regions. The sensor elements are usually joined together in such a way that a contiguous sensor area of the image sensor is formed overall. An image that is imaged onto the sensor area by the optical configuration is converted into electrical signals by the sensor elements, each sensor element corresponding to a pixel of the recorded image. In this case, the resolution of the image sensors is dependent upon the resolution of the optical configuration used and the dimensions of the sensor elements.

Production-dictated tolerances of the optical and electrical properties of the individual sensor elements can occur in image sensors. This is the case, for example, to a great extent with CMOS sensor elements (CMOS pixel sensor). As a result of the production-dictated tolerances, varying electrical signals, which become apparent as so-called fixed pattern noise (FPN) and as signal noise, are produced for different sensor elements even in the event of irradiation with the same quantity of light. In order to compensate for these undesired tolerances, special compensation circuits are necessary.

Published, Non-Prosecuted German,Patent Application DE 195 24 577 A1 describes an image sensor. The measured values of a plurality of sensor elements are averaged by addition of charges generated during the measurement by the individual sensor elements. A/D conversion of the summed charges is then carried out.

SUMMARY OF THE INVENTION

It is accordingly an object of the invention to provide an image sensor having a multiplicity of pixel sensor regions which overcomes the above-mentioned disadvantages of the prior art devices of this general type, in which the measured values are averaged and subjected to A/D conversion in a simple manner.

With the foregoing and other objects in view there is provided, in accordance with the invention, an image sensor, including a multiplicity of pixel sensor regions each having a plurality of sensor elements; a clocked sigma/delta analog-to-digital converter; and an optical configuration for imaging an image to be recorded onto the multiplicity of pixel sensor regions, during a recording of the image for each of the multiplicity of pixel sensor regions measured values of the plurality of sensors elements are averaged resulting in average values and each of the average values corresponding to a pixel of a recorded image, and within a sampling period of the image to be recorded the measured values of the plurality of sensor elements of at least one of the multiplicity of pixel sensor regions being fed successively to the clocked sigma/delta analog-to-digital converter for averaging.

The invention provides for in each case a plurality of sensor elements to be combined into pixel sensor regions. During the recording of an image for each sensor region, averaging of the electrical measured values of the sensor elements is performed, each of the average values determined in this way corresponding to a pixel of the recorded image. Consequently, each pixel of the recorded image is respectively assigned one of the sensor regions with a plurality of sensor elements. As a result of this, "spatial oversampling", as it were, is effected. The invention furthermore provides for the averaging of the measured values for each sensor region to be carried out by a sigma/delta analog-to-digital converter. Sigma/delta A/D converters contain a low-pass filter connected upstream of their output. The low-pass filter effects the desired averaging if the sigma/delta A/D converter is clocked in such a way that the measured values of the sensor elements of the sensor region are sequentially processed by it within a sampling period of the image to be recorded. In this case, both the A/D conversion of the measured values and their subsequent averaging are advantageously effected by the sigma/delta A/D converter and thus by a single circuit module.

It is advantageous that - unlike in the case of the realization of each pixel sensor region by just one sensor element - by virtue of the inventive averaging of the measured values of the sensor elements for each sensor region, the production-dictated tolerances of the sensor elements are compensated for without further compensation circuits being necessary. The smaller the dimensions of the sensor elements are and, associated with this, the more sensor elements are provided for a sensor region having a predetermined size, the better the desired compensation of production-dictated tolerances of the individual sensor elements is achieved on the basis of the averaging.

Therefore, irrespective of the limit that can be reached in respect of the optical resolution, the accuracy of the image sensor according to the invention can be constantly improved by reducing the dimensions of the sensor elements and simultaneously increasing their number for each sensor region, provided that the dimensions of the sensor regions remain unchanged, since a larger number of measured values are then averaged for each sensor region.

A development of the invention provides for the dimensions of the sensor regions to correspond as exactly as possible to the resolution of the optical configuration. The dimensions of the sensor elements are then inevitably smaller than the resolution of the optical configuration. In an advantageous manner, all the sensor elements of each sensor region then receive, during the recording of an image, in each case the same optical excitation in the form of the incident quantity of light, with the result that an optimum spatial resolution is attained.

In the case of CMOS sensors, especially, it will be possible in the future to configure the dimensions of the sensor elements to be smaller than the resolution of the commercially available optical configurations with a resolution of approximately 5×5 $\mu$m. These are particularly well suited, therefore, to use in the image sensor according to the invention.

In a development of the invention, the size of the sensor regions and thus the number of sensor elements per sensor region are variable. In the case of such an image sensor with a predetermined optical configuration and predetermined dimensions of the sensor elements, it is possible, by varying the size of the sensor regions, to increase the spatial resolution at the expense of the brightness and/or color resolution (which increases, on account of the averaging according to the invention, with the number of sensor elements per sensor region of constant size) or to decrease it in favor thereof.

A development of the invention provides for the resolution of the optical configuration to be adapted correspondingly in the event of the size of the sensor regions being varied. The effect that can thereby be achieved is that the optical configuration and the sensor regions are each coordinated with one another, with the result that an optimum resolution of the image sensor is always achieved. The resolution of the optical configuration can be adapted for example by exchanging lenses.

Sigma/delta A/D converters are disclosed for example in a reference by R. van de Plassche entitled "Integrated Analog-to-Digital and Digital-to-Analog-Converters", Kluwer-Verlag, 1994. Their fundamental structure is described further below in the explanation of an exemplary embodiment of the invention with reference to FIG. 3. If the clocked sigma/delta A/D converter is used which is clocked at the read-out frequency of the measured values of the sensor elements and to which the measured values are fed sequentially, the average value which is provided in accordance with the invention is produced at its output, at the end of a sampling period, in the form of a digital word.

In order to keep the outlay on circuitry low, it is expedient to provide a common sigma/delta A/D converter for a plurality of the sensor regions or even for all of the sensor regions, rather than providing one sigma/delta A/D converter for each sensor region. The read-out frequency of the sensor elements and the operating frequency, matched thereto, of the sigma/delta A/D converter must then be chosen to be appropriately high in order to successively determine the respective average values for each sensor region within a sampling period of the image to be recorded.

It is advantageous if, in the image sensor, the sensor elements are disposed in the form of a matrix in rows and columns and, for the purpose of determining the average values, their measured values are read out sequentially for each sensor region in each case in a row-by-row manner or column-by-column manner with respective changes of direction at the edges of the respective sensor region and are subsequently fed to the sigma/delta A/D converter. This ensures that neighboring sensor elements are always read successively within the sensor regions. The incident quantity of light hardly differs at all in the case of neighboring sensor elements which have sufficiently small dimensions, with the result that favorable conditions prevail for the averaging by the sigma/delta A/D converter, since each of the measure values to be averaged is then based on approximately the same optical excitation.

A development of the invention provides for the number of sensor element rows and sensor element columns for each sensor region to be odd in the event of row-by-row and column-by-column reading, respectively, of the sensor elements of each of the sensor regions. This has the advantage that the sensor elements of at least two neighboring sensor regions can in each case be read sequentially in such a way that after the reading of the last sensor element of a preceding sensor region, a sensor element, neighboring the latter, of the succeeding sensor region is in each case read. This is expedient because the incident quantity of light has only relatively minor differences in the case of neighboring sensor regions as well, with the result that the sigma/delta A/D converter has a favorable initial state at the beginning of the respectively succeeding sensor region, as will be explained in more detail below using the exemplary embodiment with reference to FIG. 3.

A development of the invention provides for the image sensor to be a color image sensor having at least two types of sensor elements for recording in each case different colors of an image to be recorded, and for respectively neighboring sensor elements of the same type to be combined into corresponding two types of sensor regions for the purpose of averaging the measured values of the sensor elements. At least one sigma/delta A/D converter is provided for each color to be recorded, to which converter the measured values of the corresponding type of sensor regions are successively fed. The provision of separate sigma/delta A/D converters for each color is necessary since the light intensity for each recorded color is different in each case and, consequently, relatively large jumps between the respective measured values occur in the event of successive averaging of the measured values of sensor elements for different colors despite neighboring sensor elements. Therefore, the final state of the converter after the averaging of the measured values of one color is unsuitable as the initial state for the averaging of the measured values of another color.

Other features which are considered as characteristic for the invention are set forth in the appended claims.

Although the invention is illustrated and described herein as embodied in an image sensor having a multiplicity of pixel sensor regions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a plan view of a pixel sensor region;

FIG. 3 is a simplified block diagram of the image sensor with a sigma/delta A/D converter for averaging measured values of sensor elements;

FIG. 4 is a circuit diagram of the sensor elements in the form of a CMOS sensor element;

FIG. 5 is a plan view of a detail of a sensor area of another exemplary embodiment of the image sensor with sensor regions of adjustable size.

DESCRIPTION OF THE PREFERRED EMBODIMENTS

Figure 1:
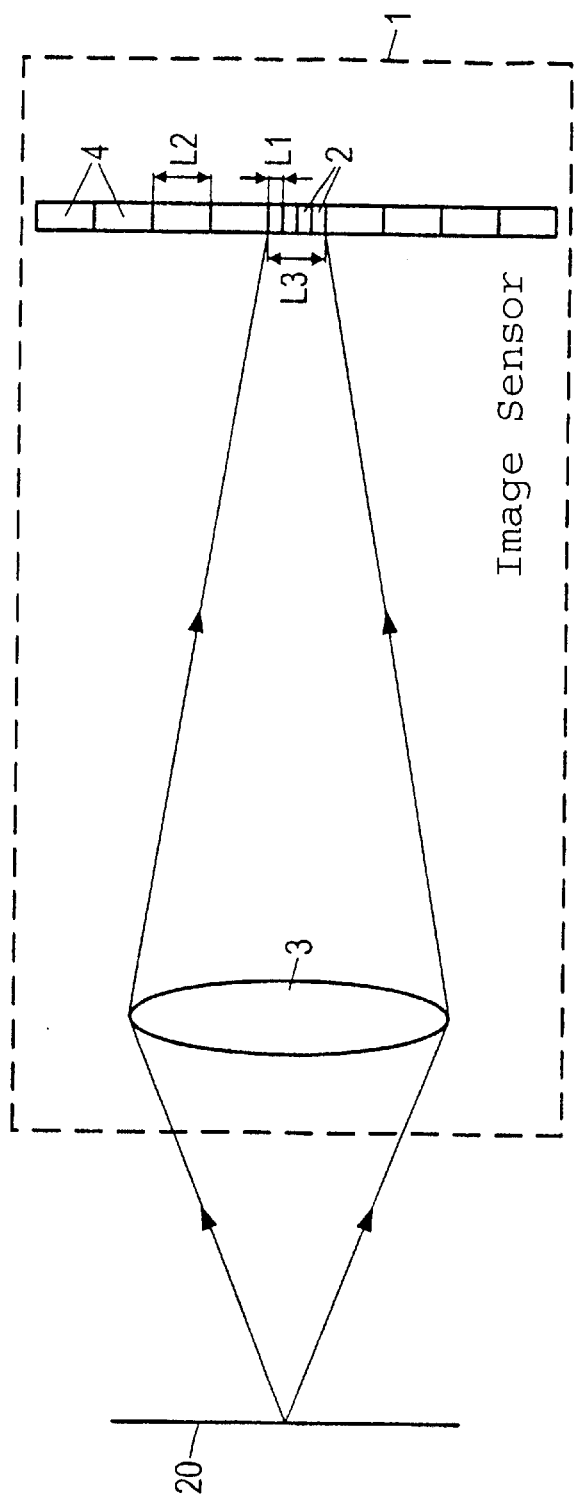
FIG. 1 is a diagrammatic, side-elevational view of an exemplary embodiment of an image sensor according to the invention.

In all the figures of the drawing, sub-features and integral parts that correspond to one another bear the same reference symbol in each case. Referring now to the figures of the drawing in detail and first, particularly, to FIG. 1 thereof, there is shown a schematic sketch of an exemplary embodiment of an image sensor 1 according to the invention. The latter has an optical configuration 3 with a resolution L3 for imaging an image 20 to be recorded onto a sensor area of the image sensor 1. The sensors area is composed of pixel sensor regions 4, each of which has a plurality of neighboring sensor elements 2. Dimensions L1 of the sensors elements 2, dimensions L2 of the sensor regions 4 and the optical resolution L3 of the optical configuration 3 are illustrated in FIG. 1. The sensor elements 2 and the sensor regions 4, just like the image 20 and the optical configuration 3, are shown simplified in a two-dimensional side view. The sensor elements 2 and/or the sensor regions 4 are square. In other exemplary embodiments of the invention, however, they may also have other shapes, for example a rectangular shape.

In FIG. 1, the resolution L3 of the optical configuration 3 corresponds to the dimensions L2 of the sensor regions 4. Consequently, the sensor elements 2 of each pixel sensor region 4 each receive approximately the same light information during the recording of the image 20, an optimum resolution of the image sensor 1 thereby being achieved, as is explained below with reference to FIG. 2.

FIG. 2 shows an exemplary embodiment of one of the pixel sensor regions 4 in a plan view. The sensor region 4 is composed of four times four, that is to say sixteen, of the sensor elements 2. The invention provides for the measured values of all the sensor elements 2 of each of the sensor regions 4 in each case to be read out sequentially and averaged for each sensor region 4, each average value corresponding to a pixel of the recorded image. The averaging of the measured values for each sensor region 4 effects compensation of production-dictated tolerances of the sensor elements 2.

While it is usually the case that each sensor element of an image sensor corresponds to a pixel of the recorded image, in the case of the invention the average value formed for each sensor region 4 corresponds to such a pixel. Since the dimensions L2 of the sensor regions 4 approximately correspond to the resolution L3 of the optical configuration 3 in the exemplary embodiment shown, the dimensions L1 of the sensor elements 2 are distinctly smaller than the resolution L3 of the optical configuration 3, with the result that all the sensor elements 2 of each sensor region 4 each receive approximately the same light information during the recording of the image 20. Since, therefore, the optical excitation of each of the sensor elements 2 to be averaged for each sensor region 4 is approximately identical, the averaging serves practically exclusively to compensate for production-dictated tolerances between the sensor elements 2.

In FIG. 2, the sensor elements 2 of the sensor region 4 are read sequentially in a row-by-row manner, beginning with the first row from the top at the left-hand edge thereof with respect to changes of direction at the edges of the sensor region 4.

FIG. 3 shows a block diagram of the exemplary embodiment of the image sensor 1 according to the invention. In the case of the image sensor 1, the sensor elements 2 are disposed in the form of a matrix along row lines R and column lines C, the sensor elements 2 being illustrated symbolically as circles. A row decoder RDEC and a column decoder CDEC are used to decode row addresses PADR and column addresses CADR, respectively, which jointly serve in each case for defining the address of one of the sensor elements 2. By use of the row addresses RADR and the column addresses CADR, measured values X of the sensor elements 2 can be read out in principle in an arbitrary order. In the case of the exemplary embodiment shown, however, the read-out takes place similarly to FIG. 2 in the order indicated by the arrows, which will be discussed further below.

Two of the sensor regions 4 into which the sensor area of the image sensor 1 is divided are illustrated by broken lines in FIG. 3. Of the sensor elements 2, the sensor regions 4 each contain nine neighboring sensor elements 2. It goes without saying that only a small number of pixel sensor regions 4, sensor elements 2, sensor element rows (or row lines) R and sensor element columns (or column lines) C are illustrated in FIG. 3, and that these are present in much larger numbers in reality.

The column decoder CDEC in FIG. 3 has the function of a multiplexer whose inputs are connected to one of the sensor element columns C in each case, and whose output is connected to one of the column lines C in accordance with the column address CADR that is present in each case. Consequently, the measured value X that is currently being read out in each case from one of the sensor elements 2 is present at the output of the column decoder CDEC. The measured values X that are read out sequentially, in the manner which will be described in more detail further below, from the sensor elements 2 are fed from the output of the column decoder CDEC to the input of a sigma/delta A/D converter ADC.

In principle, the sigma/delta A/D converter ADC contains the essential components illustrated in FIG. 3, namely a number of integrators (represented by the transfer function $K(z)$ in FIG. 3) which corresponds to an order L of the converter, a 1-bit A/D converter (realized by a comparator), a 1-bit D/A converter in a feedback loop with a summation point 10 and a digital L+1-order low-pass filter 5 (decimation filter) which is connected upstream of its output. The converter ADC converts an oversampled signal at its input into a 1-bit stream at the input of its low-pass filter 5, the quantization noise being shifted to high frequencies in the vicinity of the sampling frequency. The sequential bits of the 1-bit stream are digitally filtered by the low-pass filter 5 and converted into a single digital word having a width of n bits. The high-frequency noise of the input signal of the sigma/delta A/D converter ADC is eliminated by the low-pass filter 5.

In the case of the invention, the input signal of the converter ADC is the sequence of measured values X of the N sensor elements 2 or, expressed in another way, the exposure of the sensor regions 4, oversampled with the number of the sensor elements 2 per sensor region 4 (N=3*3=9 in FIG. 3). The signal noise caused by the sensor elements 2 themselves and the FPN are at a high frequency since the sensor elements 2 are smaller than the actual spatial resolution of the recorded image, the spatial resolution being governed by the dimensions L2 of the pixel sensor regions 4. The interference is attenuated and compensated for by averaging and low-pass filtering.

It is important that the sigma/delta A/D converter ADC is clocked at the read-out frequency of the measured values X of the sensor elements 2. This generates one bit at the input of the digital low-pass filter 5 for each of the clock periods. After the sampling of all N sensor elements 2 of the respective sensor region 4, the word having the width of n bits at the output of the low-pass filter 5 is the averaged value of their measured values X.

The accuracy of the sigma/delta A/D converter ADC increases with its order L and with the number of sampling operations per input signal, that is to say with the number N of sensor elements 2 per sensor region 4 in the present case.

Given the same dimensions L2 of the sensor regions 4, the possible resolution of the sigma/delta A/D converter ADC (in bits) and thus the accuracy of the averaging consequently increase in the case of a larger number of sensor elements 2 per sensor region 4 (that is to say in the case of smaller dimensions L1 of the sensor elements 2).

For moving-image recordings, the pixel sampling rate may be 13.5 MHz, by way of example. The pixel sensor regions 4 have to be evaluated successively, that is to say each of the average values of the measured values X of their respective sensor elements 2 have to be determined, at this frequency. Consequently, 74 ns are available for forming each average value. If, as in the case of the exemplary embodiment in FIG. 3, a common sigma/delta A/D converter ADC is provided for all of the sensor regions 4 of the image sensor 1, the latter must consequently operate at a clock rate of N * 13.5 MHz, where N corresponds to the number of sensor elements 2 for each sensor region 4. Every 74/N ns the measured value of the sensor element 2 is read into the sigma/delta A/D converter ADC. Every 74 ns the bit stream containing N bits is loaded into the digital low-pass filter 5 which, a short time later, outputs a word having the width of n bits.

Single-image recordings impose less stringent time requirements on the processing of the measured values.

With a constant input signal present, the sigma/delta A/D converter ADC needs a certain number of clock periods before it has settled. Only then is its output signal valid. In the case of the exemplary embodiment under consideration, however, the measured value of another of the sensor elements 2 is sampled with each clock period (in the case of other exemplary embodiments, each measured value may also be sampled repeatedly in each case). Therefore, before the reading in of the first measured values of the sensor elements 2 is begun, first of all a number (not illustrated) of further sensor elements are read out which are adjacent to the sensor elements to be read out first and, although they are exposed during the recording of an image, are not required for the actual recording. This suffices to set the initial state of the sigma/delta A/D converter ADC. On account of their being adjacent to the sensor elements 2 that are subsequently to be read out, the measured values thereof are very similar to those of the further sensor elements since they receive approximately the same quantity of light during a recording.

For the same reason, the sensor elements 2 in FIG. 3 (as in the case of the exemplary embodiment according to FIG. 2) per sensor region 4 are read out in a row-by-row manner with a respective change of direction at the edges of the sensor region 4. In this case, the sensor regions 4 in FIG. 3 have an odd number of sensor element rows R, namely three. The effect that can be achieved as a result of this is that not only are respectively neighboring sensor elements 2 within each of the sensor regions 4 read out successively, but also the last sensor element in the left-hand sensor region 4 (bottom right) is read out directly before the first sensor element 2 of the right-hand sensor region 4 (bottom left). It is advantageous that, as a result of this, a relatively large jump between the respective measured values is not produced in the case of the last sensor element 2 of the preceding sensor region 4 and the first sensor element 2 directly neighboring it, of the succeeding sensor region 4. This is because the image signals to be recorded are very similar in the case of neighboring sensor elements 2 with dimensions L1 that are small compared with the resolution L3 of the optical configuration 3. The final state of the sigma/delta A/D converter ADC on conclusion of the averaging of the measured values X of the preceding sensor region 4 is therefore a highly suitable initial state for the averaging of the measured values X of the succeeding sensor region 4, with the result that the converter ADC does not have to be reset between the determination of successive average values.

FIG. 4 shows an exemplary embodiment of the sensor elements 2. A CMOS sensor element is illustrated. It has a photodiode D that can be reset by the application of a rest signal RES to a gate of a first transistor Ti. Incident light is converted into an electrical voltage and amplified by a second transistor T2. The amplified signal can be passed as the measured value X onto one of the column lines C via a third transistor T3, which serves as a selection transistor and whose gate is connected to one of the row lines R.

FIG. 5 shows a detail from the sensor element matrix of another exemplary embodiment of the image sensor 1. In the case of the latter, the size of the sensor regions 4 can be varied by corresponding selection of the read-out sequence. Only one of the sensor regions 4 is illustrated in each case, in two different sizes. The sensor region 4 having the smaller dimensions has nine of the sensor elements 2, while the sensor region 4 having the larger dimensions has twenty of the sensor elements 2. The arrows are used to show that the read-out sequence of the measured values of the sensor elements 2 is respectively adapted, depending on the selected size of the sensor region 4, with the result that always all of the sensor elements 2 of each sensor region 4 are always read directly in succession. The dimensions L2 of the sensor regions 4 can be selected as desired by defining the read-out sequence by applying corresponding column addresses CADR and row addresses RADR to the column decoder CDEC and row decoder RDEC illustrated in FIG. 3.

Although only in each case one of the sensor regions 4 having different sizes has been illustrated in FIG. 5, it must be emphasized that, of course, all further sensor elements 2 are likewise combined into corresponding sensor regions 4 each having the same size which adjoin the sensor regions illustrated.

In FIG. 5, the smaller sensor region 4 is intended to have dimensions L2 which correspond to the resolution L3 of the optical configuration 3. The larger sensor region 4, on the other hand, has the larger dimension L2 and thus leads to a coarser spatial resolution of the recorded image. However, it affords the advantage that a larger number of sensor elements 2 are averaged for each sensor region 4 without changing the optical configuration 3 used, with the result that, as a counter move, better compensation of the production-dictated tolerances is achieved. One has, therefore, a choice between a higher spatial resolution by virtue of defining smaller pixel sensor regions 4 with relatively few sensor elements 2 or a higher brightness and/or color resolution in the opposite case.

It is particularly expedient that in a further exemplary embodiment of the invention (as an alternative to retaining the same optical configuration 3 in the manner just described), at the same time as the variation of the dimensions L2 of the sensor regions 4, a variation of the optical configuration 3 of the image sensor is carried out (indicated by the arrow between the two optical configurations 3 in FIG. 5). In this case, the size of the sensor regions 4 can always be adapted in such a way that their dimensions L2 correspond to the resolution L3; L3' respectively chosen for the optical configuration 3. The different resolutions of the optical configuration 3 are realized by exchangeable lenses.

In other exemplary embodiments of the invention, it is possible to produce those components of the image sensor 1 which contain the sensor elements 2 (as a rule on a common integrated circuit) independently of the optical configuration 3 and subsequently to perform adaptation of the dimensions L2 of the sensor regions to the optical configuration 3 ultimately chosen. The same integrated circuit with the sensor elements 2 can then be used in different image sensors having a varying optical resolution, only the read-out sequence of the sensor elements 2 having to be adapted in order to form the sensor regions 3.

Figure 6:
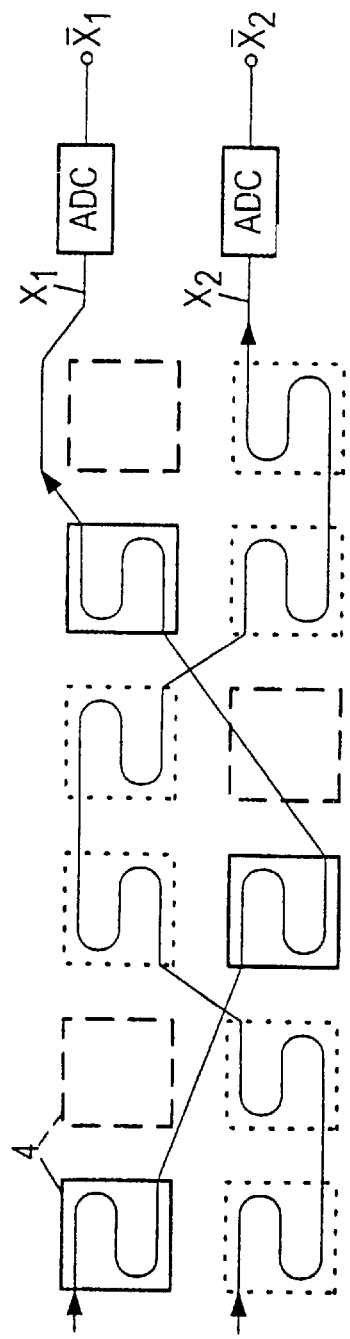
FIG. 6 is a block diagram of a detail of the sensor area of a further exemplary embodiment of the image sensor with the sensor regions for three different colors.

FIG. 6 shows a detail of the sensor area of another exemplary embodiment of the image sensor 1. It is a color image sensor and has a respective type of the sensor element 2 for recording three different colors. In the case of this sensor, it would not be expedient for the measured values X of all the sensor regions 4 to be read sequentially into a single sigma/delta A/D converter ADC, since the different types of sensor elements 2 generate different types of measured values which differ with regard to the light intensity to be detected, by way of example. In FIG. 6, the sensor elements 2 are each combined into different types of sensor regions 4, the sensor regions 4 having the sensor elements 2 of the first color being illustrated with a solid edge, those of the second color with a dashed edge and those of the third color with a dotted edge. Expedient read-out sequences for the sensor elements 2 within the sensor regions 4 are shown, which are promoted by the odd number of sensor element rows per sensor region 4 in the case of the row-by-row read-out of the sensor regions 4 shown. The measured values are read out separately for each of the colors and the measured values X1; X2 are fed sequentially to in each case one of three sigma/delta A/D converters ADC, which has been illustrated for two of the three colors, in a simplified manner, in FIG. 6.

Since three converters ADC are now available and an average value of the measured values has to be generated at the pixel sampling rate in each case, each of the converters ADC can be clocked at a third of the sampling rate. Since the converters ADC have a lower clock frequency, they can be realized with a smaller outlay.

Let the three colors be green, red and blue. In the case of color image sensors, it is customary for twice as many green pixels to be generated as red and blue ones. As an alternative, by way of example, the complimentary colors cyan, yellow and magenta may also be recorded by the color image sensor. Moreover, green is additionally possible as a fourth color, as a result of that four sigma/delta A/D converters ADC are then necessary.

The inventive averaging of the measured values of the sensor elements 2 can also be carried out in a manner other than that in the exemplary embodiment outlined. By way of example, it is possible to use another, conventional A/D converter instead of a sigma/delta A/D converter. The conventional A/D converter converts the measured values of each sensor region 4 successively into digital words, which are then stored. After all the measured values of the corresponding sensor region 4 have been converted, the digitized measured values are averaged. However, this requires additional storage devices for storing the digitized measured values. As an alternative to this, it is possible to provide as many conventional A/D converters as there are sensor elements 2 per sensor region 4. In that case, all the measured values of one of the sensor regions 4 are converted in parallel, with the result that storage prior to the averaging can be omitted. However, as a result of production-dictated tolerances of the individual A/D converters (different characteristic curves), undesirable error influences arise in this case during the determination of the average values.

Instead of the CMOS sensor elements in the exemplary embodiments explained, the sensor elements 2 may also be other image sensor elements. If they are CCDs, the read-out sequence per sensor region 4 can also be determined by the sensor elements being connected up correspondingly, instead of by free column and row addressing, since CCDs are in any case read out sequentially like a shift register.

An estimation of the word width n that can be achieved at the output of the sigma/delta A/D converter ADC as a function of its order L (usually between 2 and 4) and the oversampling N (number of sensor elements 2 per sensor region 4) results from:

$$SN=10\log\{3/2(2L+1)/p^{2L}N^{(2L+1)}\}.$$

SN is the signal-to-noise ratio that can be attained in dB. SN can be converted into the "resolution in bits" n:

$$n=(SN-1.8)/6.$$

An SN of 49.8 dB thus corresponds to a resolution of 8 bits. These are theoretical values. For a required resolution in bits, one will aim to attain approximately 6 dB SN more in the configuration of the converter, in order to have a reserve over the production and non-ideal effects:

$$n_{real}=(SN_{target}-7.8)/6.$$

It is thus possible to estimate the number N of sensor elements 2 per sensor region 4 that is required for a specific resolution. By way of example, the following result for a resolution of 8 bits: N=22 in the case of a 2nd-order converter, N=13 for 3rd order, and N=9 when a 4th-order converter is used. These are realizable values.

In the case of the pixel sensor regions 4 of a constant size, the use of a fabrication technology that is capable of larger-scale integration enables smaller, but more numerous sensor elements 2 per sensor region 4, as a result of which the oversampling rate is increased. In the case of a black/white image sensor 1 configured in accordance with FIG. 5, the dimensions L2 of the sensor regions can be varied during use by changing the read-out sequence. More sensor elements 2 having a fixed size per sensor region 4 having a varying size yield a higher gray-scale value resolution for a reduced spatial resolution. Both possibilities have the same consequence: an improved signal-to-noise ratio for the sigma/delta A/D converter and improved FPN suppression.

In the following table, for illustration purposes for a sensor region 4 containing N=3×5 sensor elements 2, the attainable word width n in bits is entered when the sensor region 4 is extended in each case by one sensor row and one sensor column (6 dB design reserve taken into account):

| Order L of the ADC | N = 3 × 5 = 15 | 4 × 6 = 24 | 5 × 7 = 35 | 6 × 8 = 48 |
|---|---|---|---|---|
| 2 | 6.8 | 8.3 | 10.0 | 10.8 |
| 3 | 9.2 | 11.7 | 13.3 | 15.0 |

The table can be interpreted as follows: if the size of the sensor region is increased e.g. from 24 sensor elements 2 to 35, that is to say by 46%, the gray-scale value depth is increased from 8.3 to 10 bits.

Another conclusion, which also applies to color sensors: if the sensor elements are reduced in size, the number of sensor elements per sensor region can be increased. A change from e.g. a 0.5 µ-technology to a 0.35 µ-technology doubles the possible oversampling rate and increases the resolution of the converter and the FPN suppression by 2.5 bits, or, if the resolution stays the same, makes it possible to use a smaller-order converter with a correspondingly smaller area and lower current consumption. A way is thus specified showing how the increase in the integration level leads to improved image sensors despite a fixed optical resolution with each process generation.

I claim:

1. An image sensor, comprising:
    a multiplicity of pixel sensor regions each having a plurality of sensor elements;
    a clocked sigma/delta analog-to-digital converter; and
    an optical configuration for imaging an image to be recorded onto said multiplicity of pixel sensor regions, during a recording of the image for each of said multiplicity of pixel sensor regions measured values of said plurality of sensors elements are averaged resulting in average values and each of the average values corresponding to a pixel of a recorded image, and within a sampling period of the image to be recorded the measured values of said plurality of sensor elements of at least one of said multiplicity of pixel sensor regions being fed successively to said clocked sigma/delta analog-to-digital converter for averaging.

2. The image sensor according to claim 1, wherein said multiplicity of pixel sensor regions each have edges, and said plurality of sensor elements are disposed as a matrix having rows and columns and the measured values per sensor region are fed to said clocked sigma/delta analog-to-digital converter in one of a row-by-row manner and a column-by-column manner with a respective change of direction at said edges of said sensor region.

3. The image sensor according to claim 2, wherein said plurality of sensor elements of each of said multiplicity of pixel sensor regions are read in a row-by-row manner, and a number of sensor element rows for each of said multiplicity of pixel sensor regions is odd.

4. The image sensor according to claim 2, wherein said plurality of sensor elements of each of said multiplicity of pixel sensor regions are read in a column-by-column manner, and a number of sensor element columns for each of said multiplicity of pixel sensor regions is odd.

5. The image sensor according to claim 1, wherein the measured values of said plurality of sensor elements of all said multiplicity of pixel sensor regions are fed successively to said clocked sigma/delta analog-to-digital converter and said clocked sigma/delta analog-to-digital converter is a common clocked sigma/delta analog-to-digital converter.

6. The image sensor according to claim 1, wherein said plurality of sensor elements include at least two types of sensor elements for recording in each case different colors of the image, said at least two types of sensor elements are in each case combined into one of two types of said multiplicity of pixel sensor regions, and at least one of said clocked sigma/delta analog-to-digital converter for averaging the measured values of the plurality of sensor elements is provided for each color to be recorded.

7. The image sensor according to claim 1, wherein said optical configuration has a resolution and said multiplicity of pixel sensor regions have dimensions that are at least approximately equal to said resolution of said optical configuration.

8. The image sensor according to claim 1, wherein said multiplicity of pixel sensor regions have dimensions that are variable and thus a number of said plurality of sensor elements per sensor region is also variable.

9. The image sensor according to claim 8, wherein said optical configuration has a resolution that is adapted depending on dimensions chosen in each case for said multiplicity of pixel sensor regions.

10. The image sensor according to claim 1, where said plurality of sensor elements are CMOS sensor elements.

11. The image sensor according to claim 1, wherein said clocked sigma/delta analog-to-digital converter is a plurality of clocked sigma/delta analog-to-digital converters in which one of said plurality of clocked sigma/delta analog-to-digital converters is connected to each of said multiplicity of pixel sensor regions.

* * * * *